United States Patent Office 3,065,202
Patented Nov. 20, 1962

3,065,202
PREPARATION OF CARBALKOXYALKYL-CONTAINING ORGANOPOLYSILOXANES
Ben A. Bluestein, Schenectady, N.Y., assignor to General Electric Company, a corporation of New York
No Drawing. Filed Mar. 20, 1957, Ser. No. 647,220
10 Claims. (Cl. 260—46.5)

This invention is concerned with a method for making carbalkoxyalkyl polysiloxanes. More particularly, the invention relates to a process for making carbalkoxyalkyl polysiloxanes directly from a hydrolyzable composition containing as an essential ingredient a cyanoalkylchlorosilane, e.g., a cyanoethylchlorosilane, which process comprises (1) effecting reaction between a cyanoalkylchlorosilane and an alcohol having the formula ROH where R is a member selected from the class consisting of monovalent hydrocarbon radicals, substituted monovalent hydrocarbon radicals and monovalent hydroxy alkyl radicals, and (2) reacting the esterified and alkoxylated composition of (1) with water to yield the carbalkoxyalkyl polysiloxanes. Such carbalkoxyethyl polysiloxanes would have silicon-bonded groups corresponding to the formula

where R has the meaning given above.

Among the cyanoaklylchlorosilanes which may be employed in the practice of the present invention are those having the formula

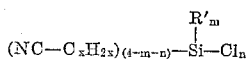

where R' is a lower alkyl radical having less than four carbon atoms, $m$ is a whole number equal to from 0 to 1, inclusive, $n$ is a whole number equal to from 2 to 3, inclusive, the total of $m+n$ being equal to at most 3, and $x$ is an integer equal to at least 2, e.g. from 2 to 8 or more. Included among such monomeric compounds are, for instance, cyanoethyltrichlorosilane, di-(cyanoethyl)-dichlorosilane, cyanoethyl methyldichlorosilane, cyanopropyltrichlorosilane, cyanobutyl propyldichlorosilane, cyanoethyl ethyldichlorosilane, etc. Compositions of this type may be prepared by effecting reaction between (1) an olefinic hydrocarbon having a cyano group attached thereto, e.g., acrylonitrile, methacrylonitrile, allyl cyanide, crotyl cyanide, α-chloroacrylonitrile, etc. and (2) a silane having silicon-bonded hydrogen, e.g., trichlorosilane, a dichlorosilane, for instance, methyldichlorosilane ($CH_3SiHCl_2$), ethyldichlorosilane, etc. Such addition is catalyzed by certain bases, for instance, tertiary amines, sodium methylate, secondary amines, etc. More particular directions for preparing these cyanoethyl chlorosilanes are found in the copending applications of Maurice Prober, Serial Nos. 401,702 and 401,703, both filed December 31, 1953, and assigned to the same assignee as the present invention, both of which applications by reference are made part of the disclosures of the instant application. Many of these cyanoalkylchlorosilanes are disclosed and claimed in the copending application of Glenn D. Cooper and Maurice Prober, Serial No. 401,704, filed December 31, 1953.

Among the radicals which R may represent are, for instance, methyl, ethyl, propyl, isopropyl, butyl, hexyl, benzyl, phenylethyl, dodecyl, chloroalkyl, fluoroalkyl, alkoxy alkyl, hydroxyethyl, hydroxybutyl, hydroxyalkoxyalkyl (e.g. hydroxyethoxyethyl) polyhydroxyalkyl, such as dihydroxy propyl (e.g., $CH_2OHCH_2OHCH_2$—) etc. Among such alcohols may be mentioned e.g., ethanol, butanol, ethylene glycol, propylene glycol, diethylene glycol, glycerine, pentaerythritol, ethylene chlorohydrin, bromoethyl alcohol, chlorobutyl alcohol, ethoxyethanol, fluorobutanol, etc.

In the copending application of Glenn D. Cooper and Maurice Prober, Serial No. 529,896, filed August 22, 1955, and assigned to th same assignee as the present invention, there are disclosed and claimed carboxy alkyl polysiloxanes having the formula

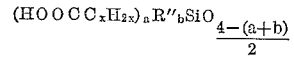

where R" is a member selected from the class consisting of alkyl radicals, e.g., methyl, ethyl, propyl, butyl, cyclohexyl, cycloheptyl, etc., radicals; aryl radicals, e.g., phenyl, diphenyl, naphthyl, tolyl, ethylphenyl, etc., radicals; aralkyl radicals, e.g., benzyl, xylyl, phenylethyl, etc., radicals; and haloaryl radicals, e.g., chlorophenyl, dibromophenyl, etc., radicals; $x$ is an integer equal to from 2 to 18, inclusive, and preferably from 2 to 5, inclusive; $a$ has a a value of from 0.01 to 2.0; and the sum of $a+b$ is from 1.0 to 2.5, inclusive. These carboxyalkylpolysiloxanes are obtained by hydrolyzing with water a composition containing as an essential ingredient a cyanoalkylchlorosilane of the formula recited above. In order to make esters of the carboxy alkyl polysiloxanes, it is necessary to react the latter materials with the desired alcohol. This two-step process involves considerable operational difficulties and, in addition, conversion to the ester and polysiloxane state is often incomplete and requires careful and extensive control to obtain the yield and purity of product desired.

I have unexpectedly discovered that I can obtain esters of carboxy alkyl polysiloxanes rapidly and simply whereby esterification and alkoxylation are carried out, first by effecting direct reaction between an alcohol of the class referred to above and a cyanoalkylchlorosilane, e.g., a cyanoethylchlorosilane, and thereafter completing conversion to the final polysiloxane state by reacting the ester alkoxylated product with water.

My reaction is believed to proceed through an imino intermediate state. Thus, taking the preparation of an ester of cyanoethyltrichlorosilane as an example, the following equation illustrates what is believed to be the steps which my process passes through:

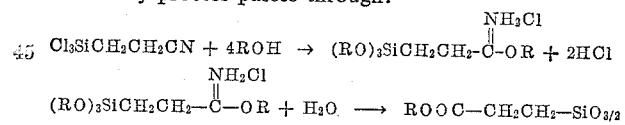

In effecting alcoholysis of the cyanoalkylchlorosilane to the carbalkoxyalkyl polysiloxane state, there should be employed a sufficient amount of the alcohol to react not only with the cyano group but also to effect conversion to alkoxy groups of all the silicon-bonded chlorines in the cyanoalkylchlorosilane and any other silicon-bonded chlorines which may be present in other organochlorosilanes used for coreaction purposes. Thus, preferably one employs one mol of the alcohol (if esterification is desired through one hydroxy group of the alcohol) for each cyano group of the cyanoalkyl radical plus one mol of the alcohol for each silicon-bonded chlorine in the hydrolyzable composition. As a minimum, the molar concentration when hydrolyzing, for example, cyanoethyltrichlorosilane to give the carbalkoxyethyl pilysiloxane is about 4 mols of the alcohol per mol of the cyanoethyltrichlorosilane. If cohydrolyzable silanes, such as methylchlorosilanes, are employed with the cyanochlorosilanes, the total molar equivalents of alcohol may even be less due to the fact that these additional chlorosilanes are not requiring the alcohol for the purpose of converting cyano groups to carbalkoxyethyl groups. Obviously, excesses of the alcohol (e.g., up to 4 to 8 or more mols of the alcohol) over and above those required as a minimum satisfaction of the molar requirements may be employed without departing from the scope of the invention. Where polyhydric alcohols are employed the molar ratios will still further be varied depending on whether it is desired to effect esterification through more than one hydroxy group of the alcohol.

In order to effect conversion of the cyanoalkyl chlorosilane, either alone or combined with other organochlorosilanes, for instance, methyltrichlorosilane, dimethyldichlorosilane, trimethylchlorosilane, methyldichlorosilane, diethyldichlorosilane, phenyltrichlorosilane, methyl phenyldichlorosilane, etc. (where the cyanoalkylchlorosilane comprises e.g., at least 1 mol percent of the molar concentration of the mixture of the latter and the copolymerizable organochlorosilane), it is only necessary to mix the cyanoalkylchlorosilane or mixtures of the latter with other organochlorosilanes, with the desired alcohol in the proper molar concentrations and preferably heat the mixture at an elevated temperature, for instance, at about 50° C. to the reflux temperature of the mass for times ranging from a few minutes to several hours or more. In this way the silicon-bonded chlorine atoms will be converted to alkoxy groups and the cyano group will be converted to the carbalkoxyalkyl group.

Thereafter enough water is added to effect conversion (in the presence of the liberated HCl derived from the silicon-bonded chlorine) of the alkoxy groups to polysiloxane linkages. Generally I prefer to employ at least one mol water per silicon-bonded chlorine atom in the starting cyanoalkylchlorosilane mixture of the latter and cohydrolyzable chlorosilanes. Advantageouely, one employs an excess of water, e.g., from 2 to 20 or more mols water per silicon-bonded chlorine atom. The esterified alkoxylated product is preferably added to the water with stirring making sure that excessive rises in temperature do not occur. For this purpose cooling means to maintain temperatures of from 25° to 60° C. may be used to advantage.

In order that those skilled in the art may better understand how the present invention may be practiced, the following examples are given by way of illustration and not by way of limitation. All parts are by weight.

The cyanoethyltrichlorosilane employed in the following examples was prepared by effecting reaction between equimolar amounts of acrylonitrile and trichlorosilane using about 5 mol percent tributylamine as a catalyst, as is more particularly recited in the copending application of Maurice Prober, Serial No. 401,702, filed December 31, 1953, and assigned to the same assignee as the present invention.

EXAMPLE 1

About 282 grams molten cyanoethyltrichlorosilane (1.51 mols) was added rapidly to 700 ml. methanol. The mixture, which gradually deposited a white solid, was heated at the reflux temperature of the mass for about three hours at the end of which time a two-fold weight excess of water was added. The oil which precipitated was separated and washed with water several times. This viscous oil became a hard, resinous solid upon standing at room temperature several days. Analysis of this composition by infrared absorption spectrum showed no evidence of any nitrile groups and established the presence of silicon-bonded carbomethoxy ethyl radicals having the formula

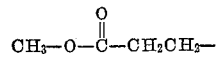

This composition consisted essentially of recurring

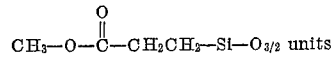

EXAMPLE 2

A mixture of chlorosilanes comprising 49 grams (0.25 mol) cyanoethyltrichlorosilane, 96 grams (0.75 mol) dimethyldichlorosilane and 30 grams (0.28 mol) trimethylchlorosilane was added rapidly to 300 ml. methanol. The mixture was heated for about 2½ hours at the reflux temperature of the mass. At the end of this time the addition of 800 ml. water precipitated an oil which, when washed four times with water, yielded a viscous fluid which, upon analysis, showed the presence of ester groups and the absence of nitrile groups. This composition contained dimethylsiloxy groups, trimethylsiloxy groups and carbomethoxyethylsiloxy groups.

EXAMPLE 3

About 38 grams (0.2 mol) cyanoethyltrichlorosilane was added to 100 grams of ethanol to give a white precipitate. The mixture of ingredients was heated at the reflux temperature of the mass for about three hours, diluted with at least three volumes of water and the oily phase removed, and again washed with water. The viscous liquid thus obtained was found to have, upon analysis by infrared spectrum, carboethoxyethyl ester groups attached to silicon and to be free of cyano groups. On standing, this liquid became a hard, firm gel after several days at room temperature.

EXAMPLE 4

A mixture composed of 100 grams trimethylchlorosilane and 188 grams cyanoethyltrichlorosilane was added to 1000 ml. of ethyl alcohol. The mixture was heated at the reflux temperature of the mass for three hours, after which 1500 ml. water was added and the resulting fluid which separated was removed and washed with a 15 percent solution of sodium sulfate, isolated and dried over sodium sulfate. The remaining viscous fluid thus obtained was heated at elevated temperatures to remove all low-boiling volatiles boiling below 200° C. (pot temperature). The residual viscous fluid was analyzed by infrared spectrum and found to have carbethoxyethyl groups attached directly to silicon. This material was composed of trimethylsiloxy units and carbethoxyethylsiloxy units.

EXAMPLE 5

15 grams cyanoethyltrichlorosilane was added to 15 grams ethylene glycol with stirring and the mixture heated at the reflux temperature of the mass. Thereafter, the reaction product was mixed with 250 ml. water to yield an oily phase which was separated and which, upon standing at room temperature, became a hard gel. This composition contained recurring siloxy units in which the silicon atom had attached thereto ester groups formed from reaction of the cyanoethyl groups and the ethylene glycol.

EXAMPLE 6

A mixture composed of 10.8 grams trimethylchlorosilane and 18.8 grams cyanoethyltrichlorosilane was added with stirring to 100 grams ethylene glycol. The solution thus obtained was heated at about 60° C. for one hour. About 200 ml. water was added to the reaction product and the resulting oily phase was separated and dried. This latter oil changed to a firm gel on standing at room temperature for about 6 to 10 days. This composition was composed of trimethylsiloxy units and siloxy units whose silicon atom had attached thereto an ester group derived from reaction of the cyanoethyl group and the ethylene glycol.

EXAMPLE 7

In this example, various esters of carboxyalkylpolysiloxane were prepared by employing different types of alcohols for esterification purposes. More particularly, mixtures of cyanoethyltrichlorosilane, dimethyldichlorosilane, and trimethylchlorosilane in varying molar concentrations were formed into a blend, and this blend of chlorosilanes was added slowly with vigorous stirring to an alcohol. When the addition was completed, the mixture was heated for about 3 hours at the reflux temperature of the mass while the stirring was continued. The suspension of solid in liquid was cooled and this latter reaction product was then hydrolyzed by mixing it with a large excess of water. The oily layer which was obtained in each instance was separated and neutralized by stirring with solid sodium bicarbonate and thereafter filtered. The filtrate was then dried to remove any occluded water and distilled to remove essentially all materials boiling below 215–210° C. at 7 to 10 mm. pressure. The following Table I shows the weights, molar concentrations and volumes of the various ingredients used to make the methyl carbalkoxyethylpolysiloxane which was composed of trimethylsiloxy units, dimethylsiloxy units, and siloxy units of the formula $$ROOC\text{---}CH_2CH_2SiO_{3/2}$$

where R is the residue of the alcohol used.

*Table I*

| Sample No. | $NCC_2H_4SiCl_3$ | | $(CH_3)_2SiCl_2$, Weight Grams | $(CH_3)_3SiCl$ | | Alcohol | | Water, Vol. ml. |
| --- | --- | --- | --- | --- | --- | --- | --- | --- |
| | Weight Grams | Mol Percent | | Weight Grams | Mol Percent | Type | Vol. ml. | |
| 1 | 31.4 | 5.1 | 375 | 21.0 | 5.95 | $CH_3OH$ | 280 | 750 |
| 2 | 66.0 | 10.0 | 356 | 43.0 | 11.2 | $CH_3OH$ | 360 | 1,000 |
| 3 | 264.0 | 19.9 | 538 | 158.4 | 20.8 | $CH_3OH$ | 720 | 2,200 |
| 4 | 31.0 | 5.0 | 375 | 21.0 | 6.0 | $C_2H_5OH$ | 600 | 1,500 |
| 5 | 31.4 | 5.1 | 375 | 21.0 | 6.0 | $HO\text{---}C(CH_3)(CH_3)H$ | 525 | 750 |
| 6 | 9.5 | 5.0 | 115 | 6.5 | 6.0 | $HO(CH_2)_2OH$ | 200 | 200 |

Instead of using cyanoethyltrichlorosilane, one can employ other cyano-alkylchlorosilanes, many examples of which have been given above. In addition, the concentration of the cohydrolyzable organochlorosilane as well as the type of cohydrolyzable organochlorosilane can be varied within wide limits as is evident from the preceding disclosures.

Thus, on a molar basis, the concentration of the cyanoalkylchlorosilane and other cohydrolyzable chlorosilanes can be within the following range:

| | Mol percent |
| --- | --- |
| Cyanoalkylchlorosilane | 1 to 100 |
| Organochlorosilane free of silicon-bonded cyanoalkyl groups | 0 to 99 |

Likewise, the concentration of the alcohol and the type of alcohol used can be varied widely as mentioned previously to obtain equivalent results. Thus, the alkyl residue of the alcohol can be substituted with one or more halogens, e.g., chlorine, bromine, fluorine, etc.

The esters prepared in accordance with the practice of the present invention can be used as plasticizers for various organopolysiloxane resins and rubbers. Some applications may advantageously employ organopolysiloxane esters having residues from longer chain alcohols than those employed in the preceding examples in order to impart further plasticization as a result of the longer chains, for instance, hexyl, octyl, decyl, dodecyl, etc., radicals derived from alcohols having similar carbon chain lengths. The esters prepared by means of the process described in this application can also be employed as plasticizers for other types of resins, such as vinyl halide resins. The above-described esters have been found to be unexpectedly hydrolytically stable when heated with aqueous formic acid.

In addition to the uses recited above, the carbalkoxyalkyl polysiloxanes prepared and disclosed herein can be employed as lubricants whereby advantage can be taken of the lubricity characteristics of the residues derived from the alcohols used in the process and the ability of the organopolysiloxane linkage to impart to compositions of this type resistance to elevated temperatures and resistance to undesirable changes in viscosity at depressed temperatures.

What I claim as new and desire to secure by Letters Patent of the United States is:

1. The process for making carbalkoxyalkyl polysiloxanes which comprises (1) heating at a temperature above 50° C. a mixture of (a) a cyanoalkylchlorosilane having the formula $$(NC\text{---}C_xH_{2x})_{(4-m-n)}\text{---}\underset{\underset{Cl_n}{|}}{\overset{\overset{R'_m}{|}}{Si}}$$

where R' is a lower alkyl radical of less than 4 carbon atoms, $m$ is a whole number equal to from 0 to 1, inclusive, and $n$ is a whole number equal to from 2 to 3, inclusive, the total of $m+n$ being equal to at most 3, and $x$ is an integer equal to from 2 to 8, and (b) an alcohol having the formula ROH where R is a member selected from the class consisting of hydrocarbon radicals, hydroxyalkyl radicals, and halogen-substituted hydrocarbon radicals, there being employed at least 1 mol of the alcohol per cyano group of the cyanoalkylchlorosilane, and at least 1 additional mol of the alcohol for each silicon-bonded chlorine atom in the hydrolyzable cyanoalkylchlorosilane, and (2) hydrolyzing the esterified and alkoxylated composition of (1) with water to yield the carbalkoxyalkyl polysiloxane, there being employed at least one mol of water per silicon-bonded chlorine atom in the hydrolyzable cyanoalkyl chlorosilane.

2. The process as in claim 1 in which the alcohol is methanol.

3. The process as in claim 1 in which the alcohol is ethanol.

4. The process as in claim 1 in which the alcohol is isopropanol.

5. The process as in claim 1 in which the alcohol is ethylene glycol.

6. The process as in claim 1 in which the alcohol is glycerine.

7. The process for making a methyl ester of a carboxyethylpolysiloxane which comprises (1) heating at a temperature above 50° C. a mixture of cyanoethyltrichlorosilane and methanol, there being employed at least 4 mols methanol per mol cyanoethyltrichlorosilane, and (2) hydrolyzing the esterified and alkoxylated composition of (1) with water to yield the methyl ester of carboxyethylpolysiloxane there being employed at least three mols of water per mol of cyanoethyltrichlorosilane.

8. The process as in claim 7 in which prior to reaction with the methanol, the cyanoethyltrichlorosilane is combined with another alkyl chlorosilane in which the silicon atom is free of silicon-bonded cyanoethyl groups.

9. The process as in claim 7 in which prior to reaction with the methanol, the cyanoethyltrichlorosilane is in combination with trimethylchlorosilane and dimethyldichlorosilane.

10. The process for making a methyl ester of carboxyethylpolysiloxane which comprises (1) forming a chlorosilane blend composed of cyanoethyltrichlorosilane dimethyldichlorosilane, and trimethylchlorosilane, (2) heating the chlorosilane blend at temperatures above 50° C. with an amount of methanol sufficient to effect esterification of the cyano groups and to convert essentially all the silicon-bonded chlorine atoms to alkoxy radicals, there being employed at least one mol of the methanol per cyano group of the cyanoethyltrichlorosilane and at least one additional mol of the methanol for each silicon-bonded chlorine atom in the mixture of hydrolyzable chlorosilanes, and (3) hydrolyzing the composition of (2) with water to obtain a carbomethyoxyethyl methylpolysiloxane containing units having the formulae $$CH_3OOC-CH_2CH_2SiO_{3/2}$$
$$(CH_3)_2SiO$$

and $$(CH_3)_3SiO_{1/2}$$

there being employed at least one mol of water per silicon-bonded chlorine atom in the chlorosilane blend.

References Cited in the file of this patent

UNITED STATES PATENTS

| | | |
|---|---|---|
| 2,691,032 | Sommer | Oct. 5, 1954 |
| 2,723,987 | Speier | Nov. 15, 1955 |
| 2,776,306 | Cole | Jan. 1, 1957 |
| 2,855,381 | Sommer | Oct. 7, 1958 |

FOREIGN PATENTS

| | | |
|---|---|---|
| 1,116,725 | France | Feb. 6, 1956 |
| 1,116,726 | France | Feb. 6, 1956 |

OTHER REFERENCES

Wagner et al.: "Synthetic Organic Chemistry" (1953), John Wiley and Sons, Inc., New York, publishers, pp. 485–6.

Noller: Textbook of Organic Chemistry, 1951, page 199, publ. by W. B. Saunders Co., Philadelphia, Pa.